United States Patent [19]

Kjorsvik

[11] Patent Number: 5,748,190
[45] Date of Patent: May 5, 1998

[54] PRESENTATION SYSTEM FOR INDIVIDUAL PERSONAL COMPUTERS IN A PERSONAL COMPUTER NETWORK

[75] Inventor: Reidar Kjorsvik, Skaarer, Norway

[73] Assignee: WiseVision AS, Oslo, Norway

[21] Appl. No.: 524,297

[22] Filed: Sep. 5, 1995

[51] Int. Cl.[6] ............................................. G06T 1/00
[52] U.S. Cl. ........................... 345/329; 707/104; 707/10; 395/670
[58] Field of Search ........................ 434/350, 327, 434/362; 379/92, 67, 88; 395/806, 200–9, 670–678; 345/326–330; 707/104, 10

[56] References Cited

U.S. PATENT DOCUMENTS

| | | | |
|---|---|---|---|
| 3,784,979 | 1/1974 | Friedman et al. | 340/146 |
| 4,464,543 | 8/1984 | Kline et al. | 179/18 |
| 4,715,818 | 12/1987 | Shapiro et al. | 434/118 |
| 4,761,542 | 8/1988 | Kubo et al. | 235/379 |
| 4,764,120 | 8/1988 | Griffin et al. | 434/336 |
| 4,965,772 | 10/1990 | Daniel et al. | 364/900 |
| 5,002,491 | 3/1991 | Abrahamson et al. | 434/322 |
| 5,065,309 | 11/1991 | Putnam et al. | |
| 5,105,184 | 4/1992 | Pirani et al. | 340/721 |
| 5,165,012 | 11/1992 | Crandall et al. | |
| 5,333,266 | 7/1994 | Boaz et al. | |
| 5,377,258 | 12/1994 | Bro | |
| 5,498,003 | 3/1996 | Gechter | 463/31 |
| 5,559,868 | 9/1996 | Blonder | 379/96 |
| 5,579,537 | 11/1996 | Takahisa | 455/66 |

OTHER PUBLICATIONS

Successories Spring/95 Catalog 2nd page—Attitude Savers.

*Primary Examiner*—Joseph H. Feild
*Attorney, Agent, or Firm*—Jensen & Puntigam, P.S.

[57] ABSTRACT

The network presentation system includes a database on a network server, the database being administered and controlled by an administration software module. The administration module creates individual images from text and/or visual material and then organizes a series of such images into a presentation which is stored in the database. The presentation is displayed on the screens of the individual PCs in the network by the action of a messenger software module present in each PC, following passage of a selected amount of time during which the PC is on but is not used. The messenger module maintains control over the presentation of the images in the particular presentation sequence following interruptions of actual use by the PC. A PC user has the capability of returning the PC to its conventional use, but also has the capability of controlling the presentation to an extent, or even changing to an entirely different presentation among the several which may be available to that specific user.

14 Claims, 15 Drawing Sheets

PRESENTATION SYSTEM FOR INDIVIDUAL PERSONAL COMPUTERS IN A PERSONAL COMPUTER NETWORK

TECHNICAL FIELD

This invention relates generally to personal computer network systems, and more specifically to a system for providing selected presentations to the personal computers in the network at selected times.

BACKGROUND OF THE INVENTION

Personal computers and personal computer networks are well-known in the computer field. A personal computer network is a linked plurality of individual personal computers; typically, each computer is at a different location (station), controlled by a common server. A computer network enables data and work-in-progress to be readily transferred between individual computers in the network, so as to maintain commonality of the data and the work-in-progress between them. Typically, not all of the personal computers which make up such a network are operating at the same time. In fact, for most of the individual computers in a network, there could be significant time during the working day when they are not being used, even though they may be "ON" during the entire working day.

When a personal computer is in its "ON" state but not in use, its computer screen is still lit, which will ultimately lead to damage or degradation of the screen. "Screen saver" techniques are frequently used in such situations, in which a selected image appears on the screen. Such screen saver images, however, serve no other useful purpose. Accordingly, it would be desirable that useful information or other presentation material be made available to the user on his/her computer screen at selected times when the computer is not being used, as an alternative to conventional screen saver images.

DISCLOSURE OF THE INVENTION

Accordingly, the present invention is a system for presenting information to a plurality of personal computers formed into a personal computer network, the personal computers capable of conventional task operation, comprising: a system database for storing at least one presentation sequence which includes a selected sequence of images suitable for display on a personal computer screen; an administration module for composing said presentation sequence; messenger module means for controlling the display of said presentation sequence on the screen of a selected personal computer which is associated with said messenger module when said personal computer has been on but unused for a preselected period of time; and means at each personal computer for returning the personal computer to its conventional task operation.

BEST MODE FOR CARRYING OUT THE INVENTION

As discussed above, personal computers (PCs), particularly when they are used in a business context, are typically left in an "ON" state during the entire work day, even when they are not actually being used. Such PCs may have a conventional "screen saver" module, which produces certain images on the screen when the computer is not in use, in order to extend the life of the computer screen.

The present invention, which is for use in a computer network, in basic overview includes a repertoire of presentations, each of which typically takes the form of a series of successive slides or screen images. These presentations are stored in a system database located on a network server PC, and in operation of the system are provided to the individual network PCs for display on their computer screens. The presentations are initiated for each PC in the network following a selected amount of time during which each PC has been in an "on" state but has not been in use. These presentations in effect replace the conventional screen saver, but in addition, provide information in visual form which is intended to be beneficial to the user of the PC.

The presentations may be educational, providing information and/or instruction, or they may be more personal in nature, providing encouragement or similarly helpful information. In addition, of course, the presentations could include a measure of entertainment value. It should thus be clear that a wide variety of information can form the individual presentations provided to the personal computers in the network.

Figure 1:
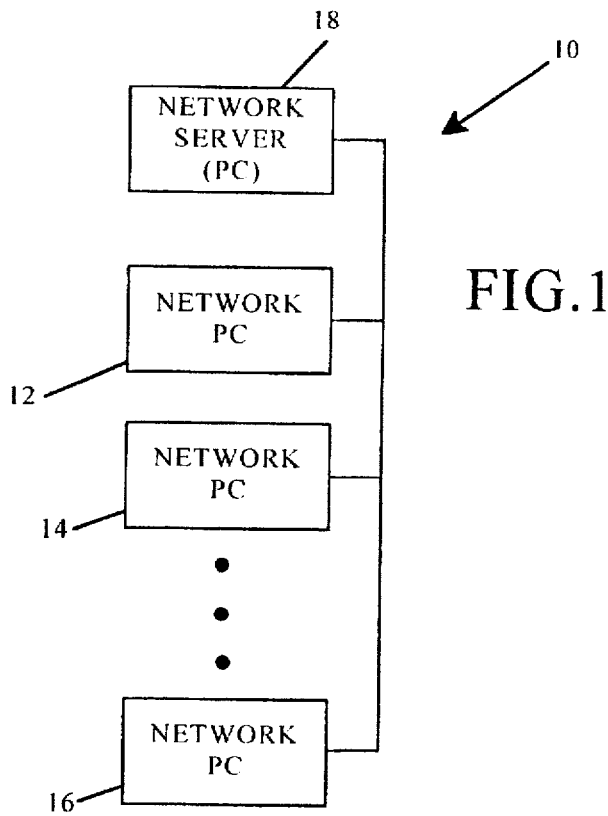
FIG. 1 is a block diagram of a personal computer network which also shows the physical arrangement of the hardware of the system of the present invention.
Figure 2:
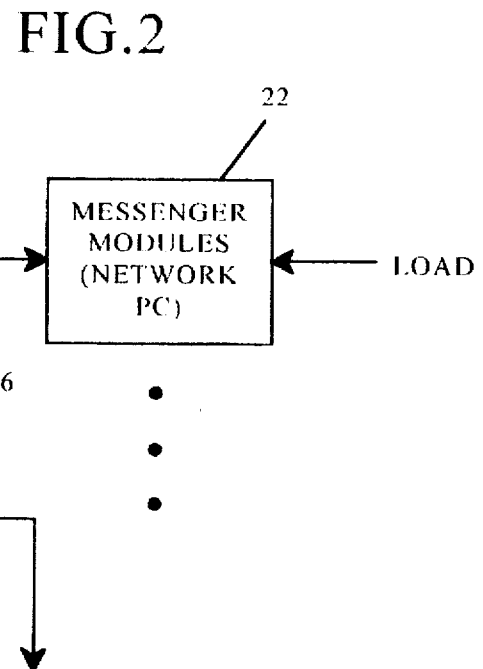
FIG. 2 is a block diagram showing the flow of data and control in the system of the present invention.

FIGS. 1 and 2 show a basic system view of the present invention. The overall computer network within which the present invention operates is shown generally at 10. The network 10 comprises a plurality of individual network personal computers 12, 14 and 16. The network of course can include a selected number of personal computers in excess of that shown. The network 10 also includes a network server PC 18 which is responsible for maintaining control over the flow of information in the network. Every other PC in the network has access to the network server and, in particular, the system database located thereon, which typically is on the hard disk of the PC. The system database on network server 18 contains the scripts and slides comprising the various available presentations, discussed in more detail below.

Referring to FIG. 2 for an overview of the data flow and control of the system, each network PC has a messenger software module 22. The messenger modules 22—22 communicate with system database 24 on the network server 18 and provide a certain amount of local control over the presentation at its associated PC. The messenger module can be loaded into a network PC from any external source, including the hard disk on the server. The system also includes an administration software module 26 which can be loaded into and executed from any PC in the network. The administration module 26 can be loaded from the server's hard disk storage, a diskette, or the PC's own memory. The administration module 26 has the basic responsibility of composing, adding to, or deleting information from the database 24 on server 18.

Administration module 26 also has the capability of communicating with external sources, including other network servers with databases having presentation information, as well as other outside sources of data and images. The administration module 26 and database 24 on server 18 are responsible for generating the various slide presentations, selecting particular slide presentations for the individual PCs in the network and scheduling those presentations in a particular sequence. A presentation is provided to an individual PC by action of its messenger module 22 through database 24. The appearance of the successive slides on the PC screen is monitored by the messenger module to ensure that the individual slides in the presentation are presented in sequential order, even in the event that there is a break in the immediate presentation, such as caused by the user operating the PC. At any point in the presentation, the user may begin use of the PC, such as for work-in-progress, by simply pushing any key on the PC keyboard except for a designated key which is for manual control of the presentation.

Thus, as can be seen from the above basic explanation, the present invention comprises a system database 24 located on the network server, an administration module 26 which communicates with database 24 on server 18, as well as external sources, and a plurality of messenger modules, with one messenger module being present in each network PC. The messenger modules also communicate with the database 24.

The administration module 26 is capable of a number of specific system functions. First, it is capable of displaying all the users in the network that have an installed messenger module. The individual users may be arranged into various groups according to the selection of the system operator, using the administration module 26. Each user is identified by a unique network identification (ID). Hence, a command to view the network users in the database 24 is provided through the administration module 26. The user's IDs and the individual presentations are contained in the system database 24.

Another function of administration module 26 in the embodiment shown concerns the creation of the individual presentations, which may be alternatively referred to as scripts. Each presentation or script consists of one or more individual slides or screens composed around a particular topic. The topic could be educational in nature, such as health or business or could involve particular training, or it could also be inspirational or motivational in nature. In addition, entertainment could be made a portion of individual presentations, or it could be a separate presentation. In any event, each script comprises a series or sequence of slides. The composition of each slide or image is discussed below. Administration module 26 creates particular presentations by arranging individual slides in a selected sequence. The presentations are then stored in database 24.

A further function of the administration module 26 concerns the actual creation of the individual slides or screens themselves. Each individual slide consists of text and/or images, with the images being provided from existing memory or files in the server 18 or from any external library source available to the system. The images may be of course quite varied. Further, there is the capability of altering existing images to a more preferred image. The same capability is true for text as well, with the operator having the ability to input text and use it for a particular slide, either alone or with an image. In addition, there is the capability of overall composition, including use of color, various backgrounds, different kinds of text fonts, etc.

All of the above concerns the composition or creation of individual slides. The basic capability of creating such slides is available in standard PC operating systems. One example is Powerpoint in WINDOWS software from Microsoft, Inc., of Redmond, Washington, which is now widely available. Administration module 26 is arranged to interface with such operating systems so that slides can be created and then arranged into presentations which are in turn stored in database 24 and made available to the network PCs in the system.

Still another function of the administration module 26 is the assignment of specific presentations to the individual PCs. This capability allows the administration module 26 to match or select particular presentations to particular users, depending upon the needs or requirements of those users. The presentations available to each user also are subject to an extent to the control of the user, as explained in more detail in the following paragraphs.

A related function of the administration module 26 concerns the particular schedule which is established for the appearance of the individual presentations at each of the network PCs. For instance, each user in the system (each network PC) will have its own unique schedule of presentations, including a particular sequence of different presentations and a specific time of nonuse required before a presentation begins. This scheduling of presentations is established through the administration module and stored in system database 24.

Lastly, presentations may be obtained or provided to external systems and/or other outside sources over external communication lines. This enables the one administration module for the system to obtain or provide presentations directly from or to external sources, so as to eliminate the need for composing them within the system.

Figure 3:
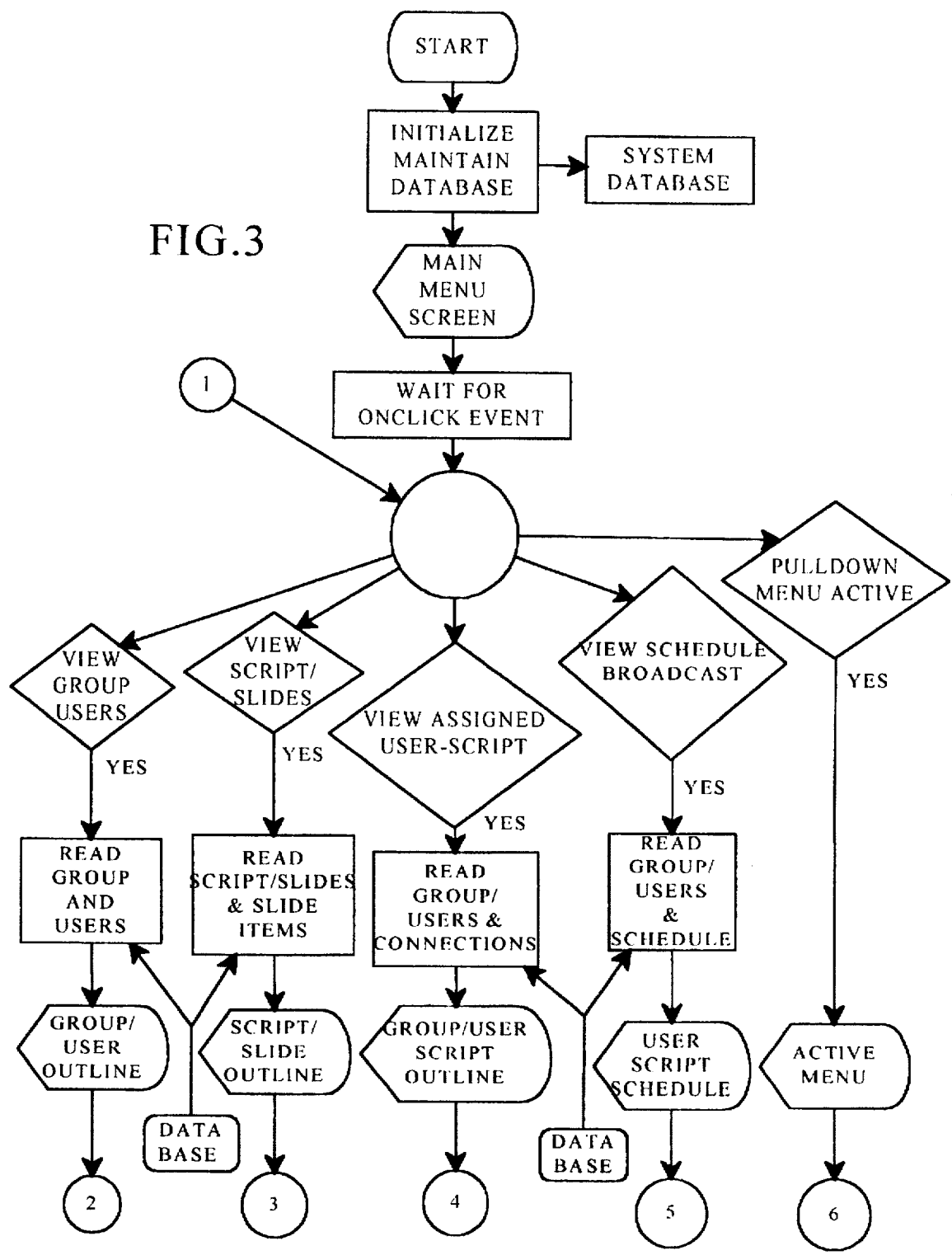
FIGS. 3–16 are flow charts for the software of the present invention.
Figure 4:
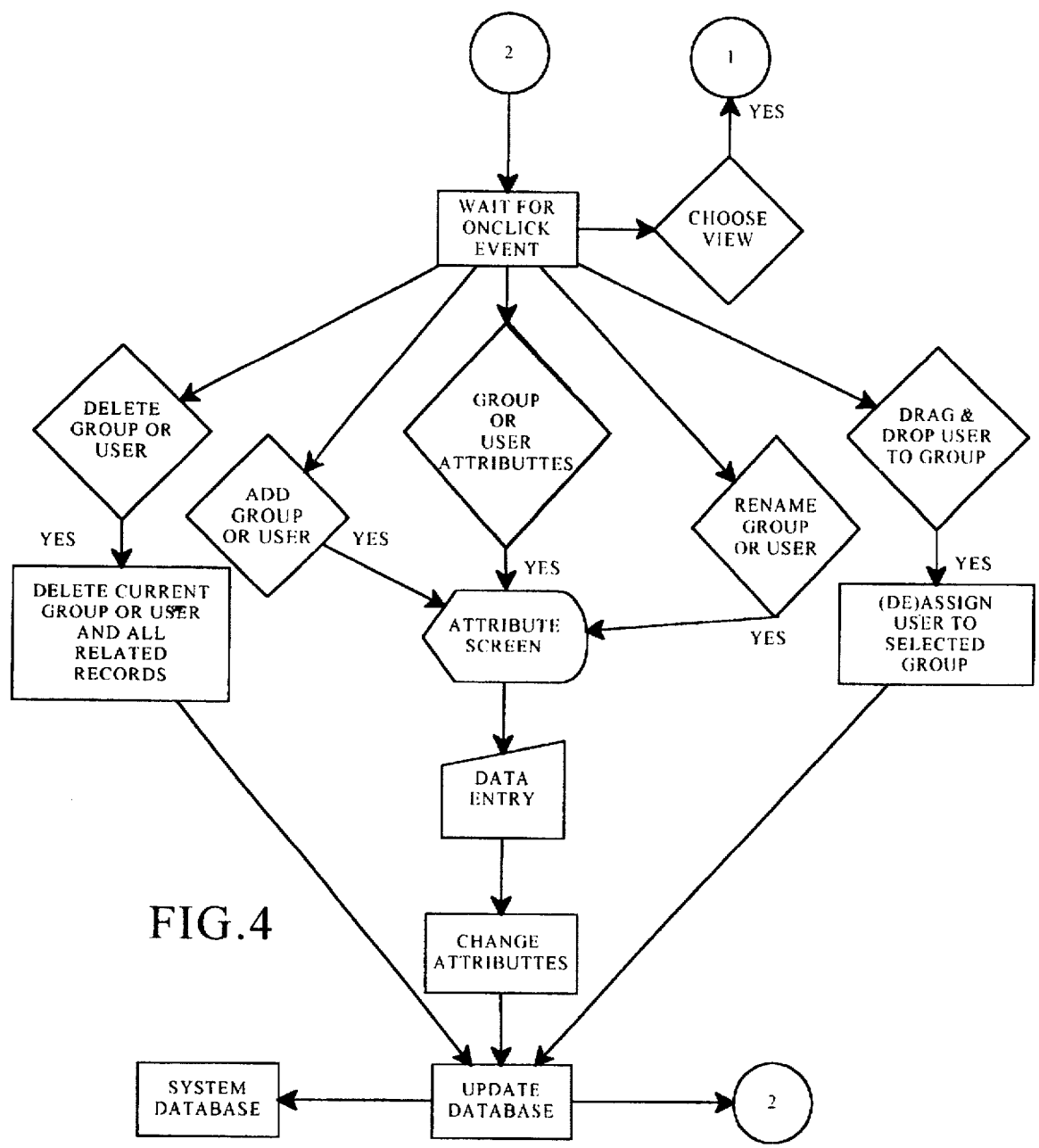
Figure 5:
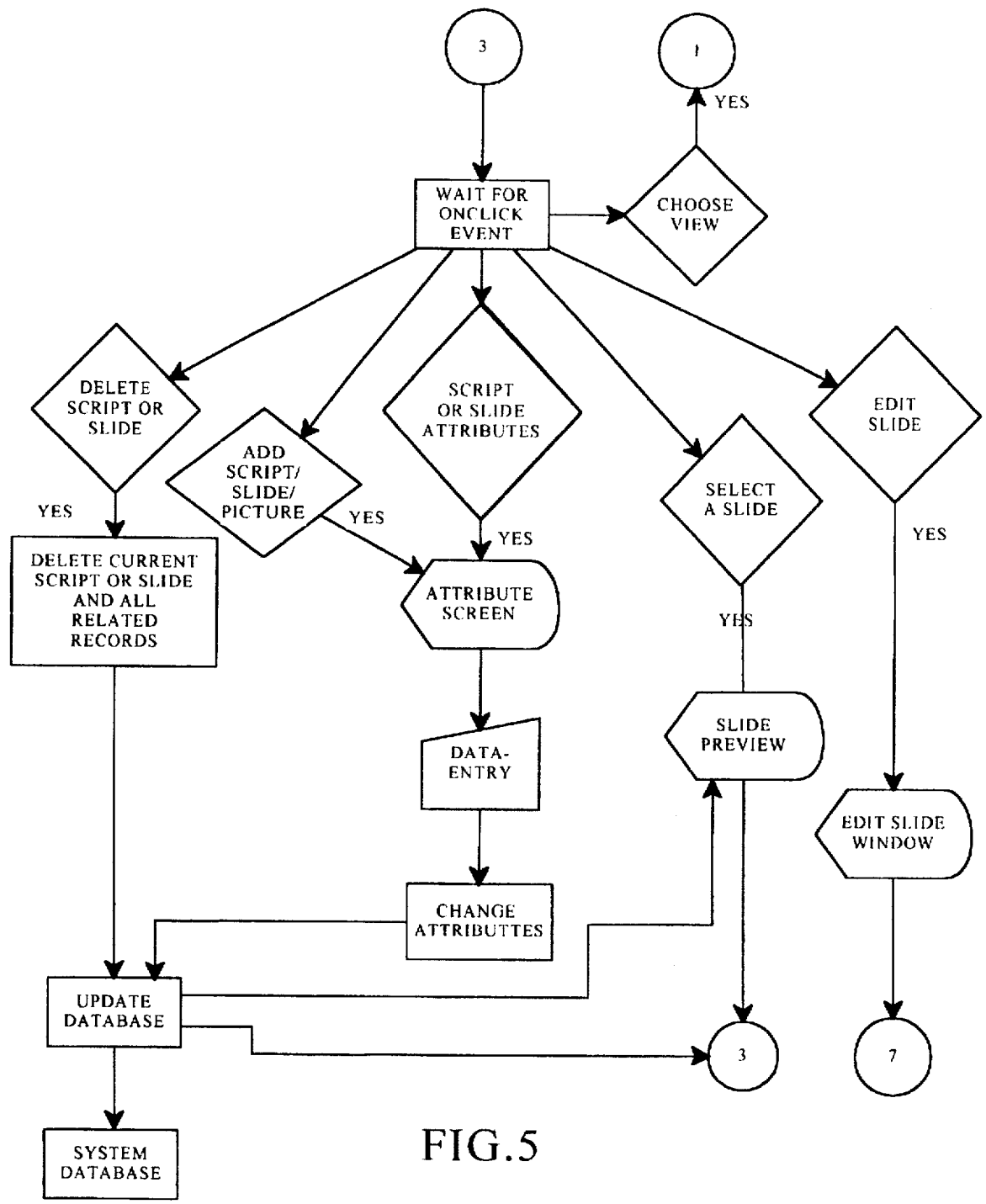
Figure 6:
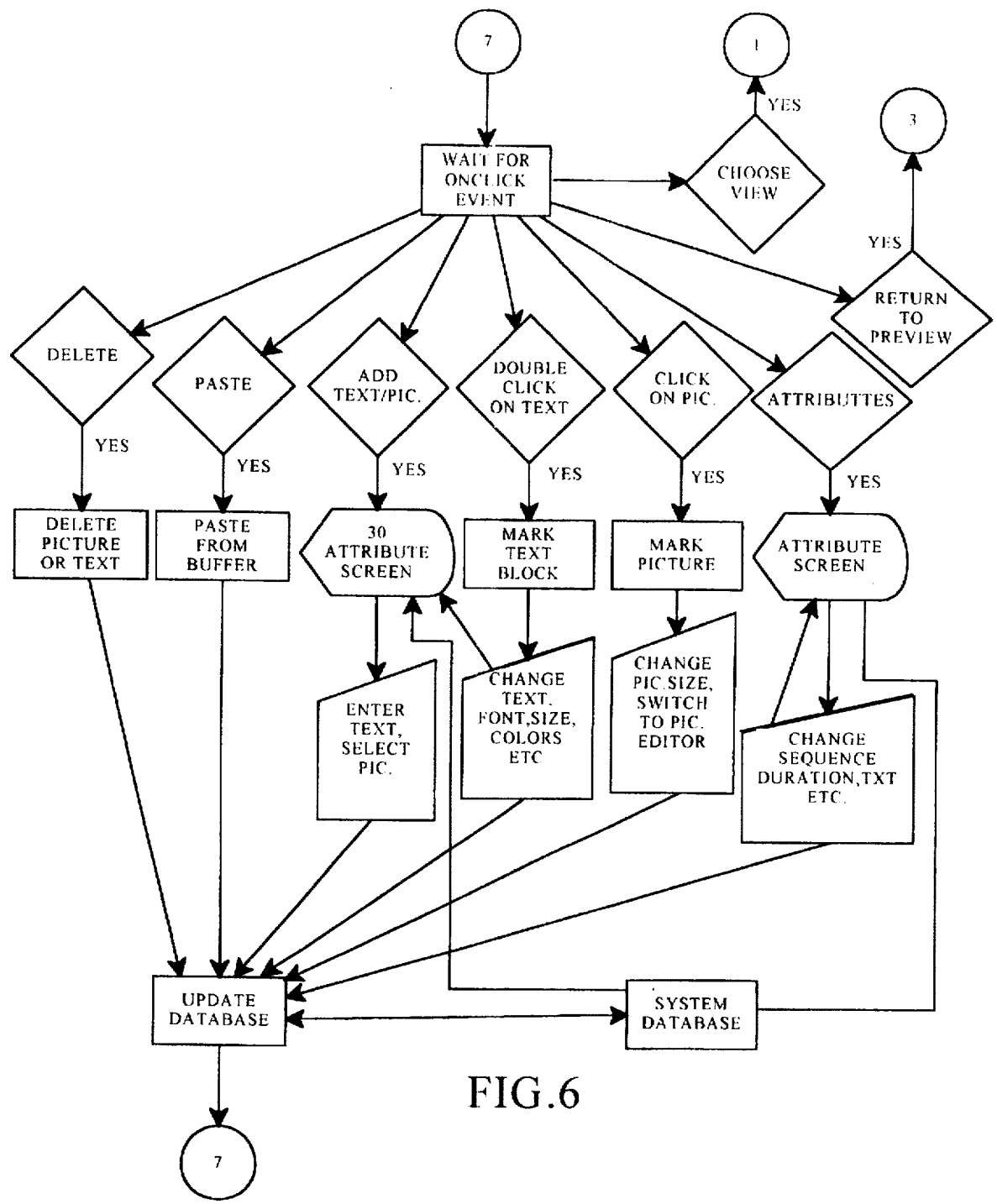

A software flow chart for these particular functions are shown in FIGS. 3–16. Most of these flow charts concern the administration module 26. FIG. 3 shows a main screen or overall flow chart for viewing the information associated with the various functions described above, and for reading that information. FIG. 4 shows more detail concerning the groups and/or specific users in the network system, including updating of the system database. FIG. 5 concerns generally the composition of a presentation from a sequence of available slides or screens. A particular slide may be edited at any time for presentation flexibility. The system database 24 is updated immediately upon such editing so as to impact presentations in effect on-line. FIG. 6 concerns the composition process for individual slides. As can be seen, a significant number of slide composition functions are available.

Figure 7:
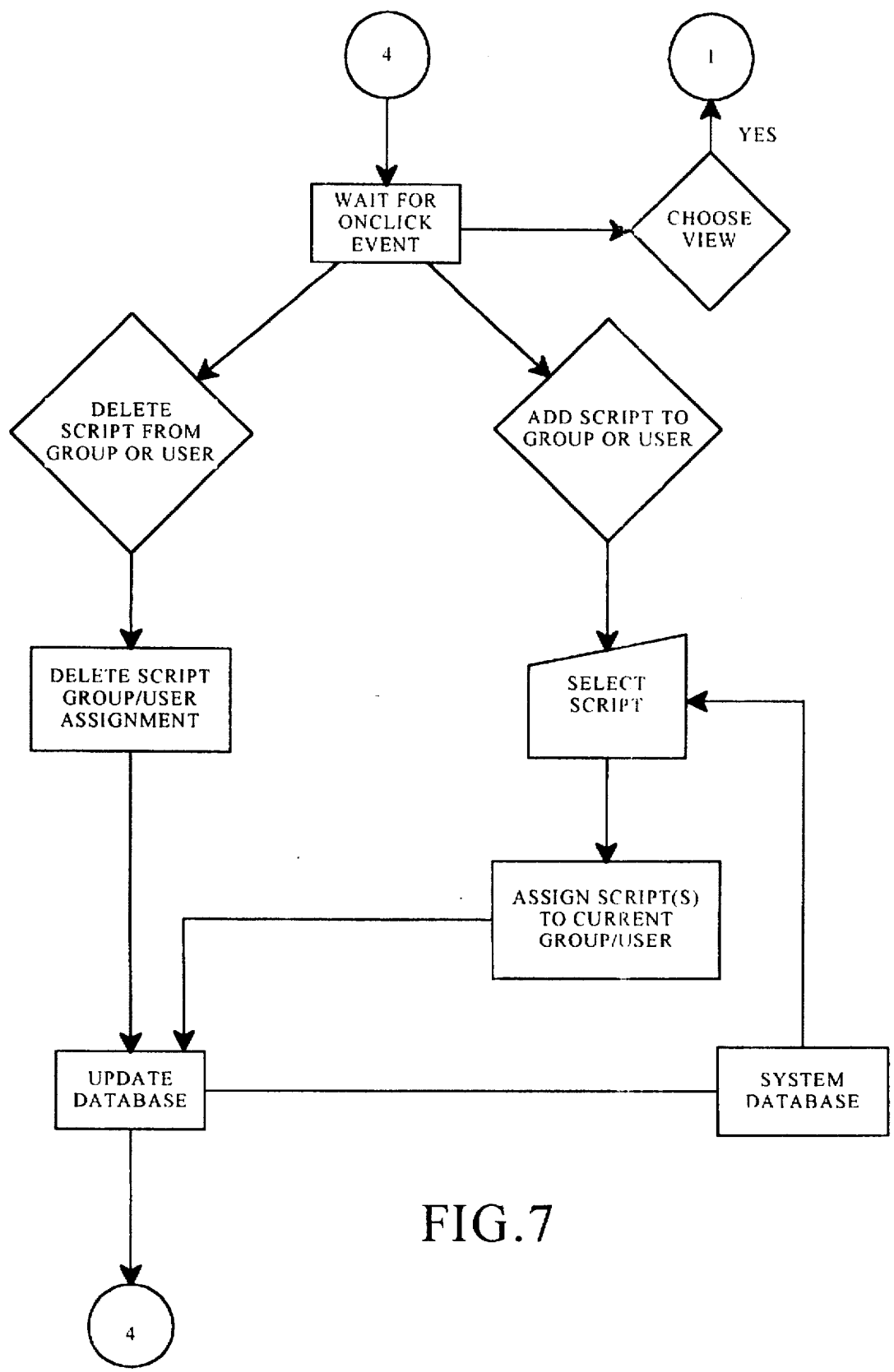
Figure 8:
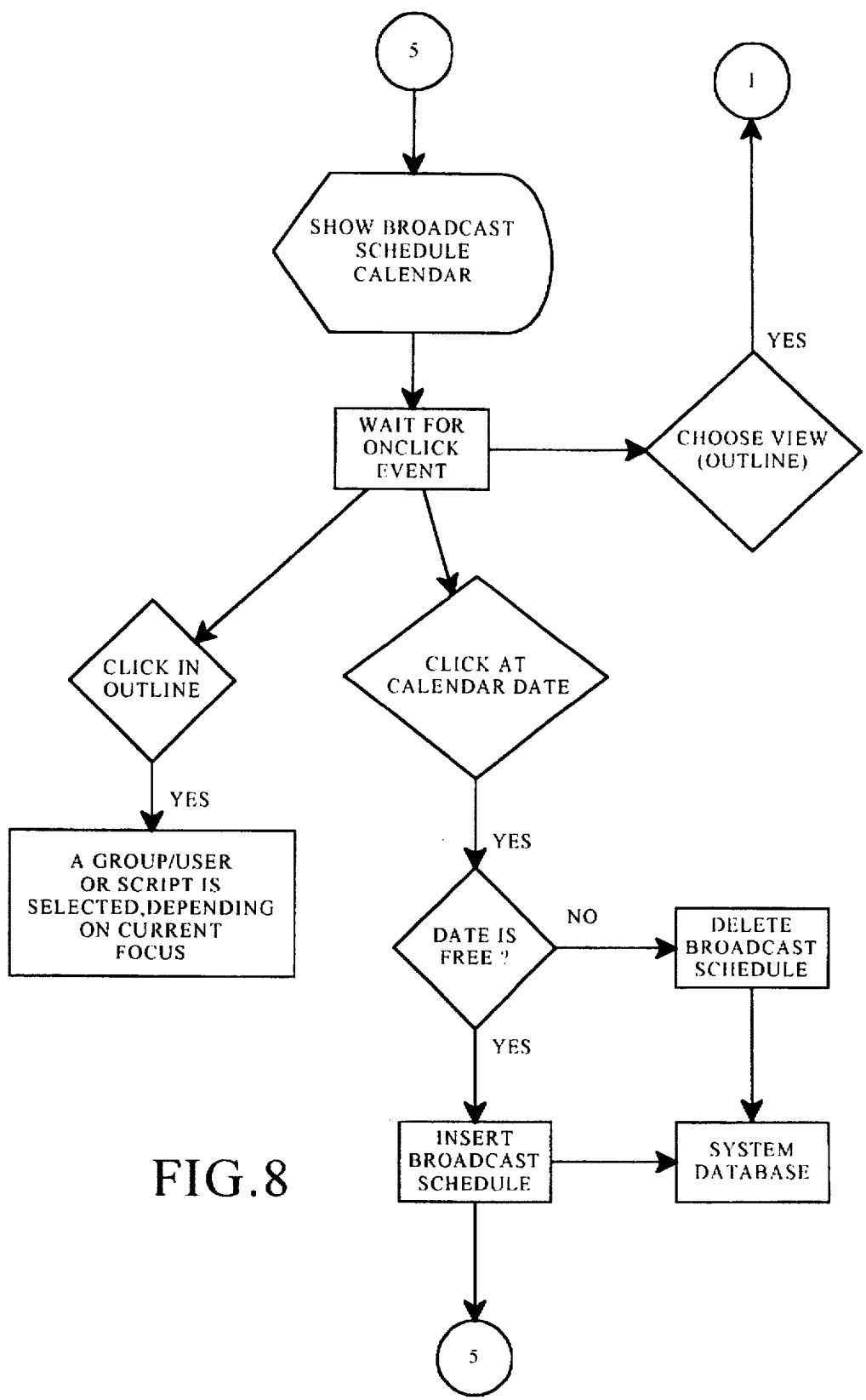

FIGS. 7 and 8 concern the assignment of particular presentations in the database to one or more network PCs, and the scheduling or selected sequence of the presentations for the individual network PCs.

It should be noted, as indicated above with respect to some of the functions, that all changes, compositions, scheduling, etc. which are made by the administration module are ultimately stored in the system database 24.

Figure 9:
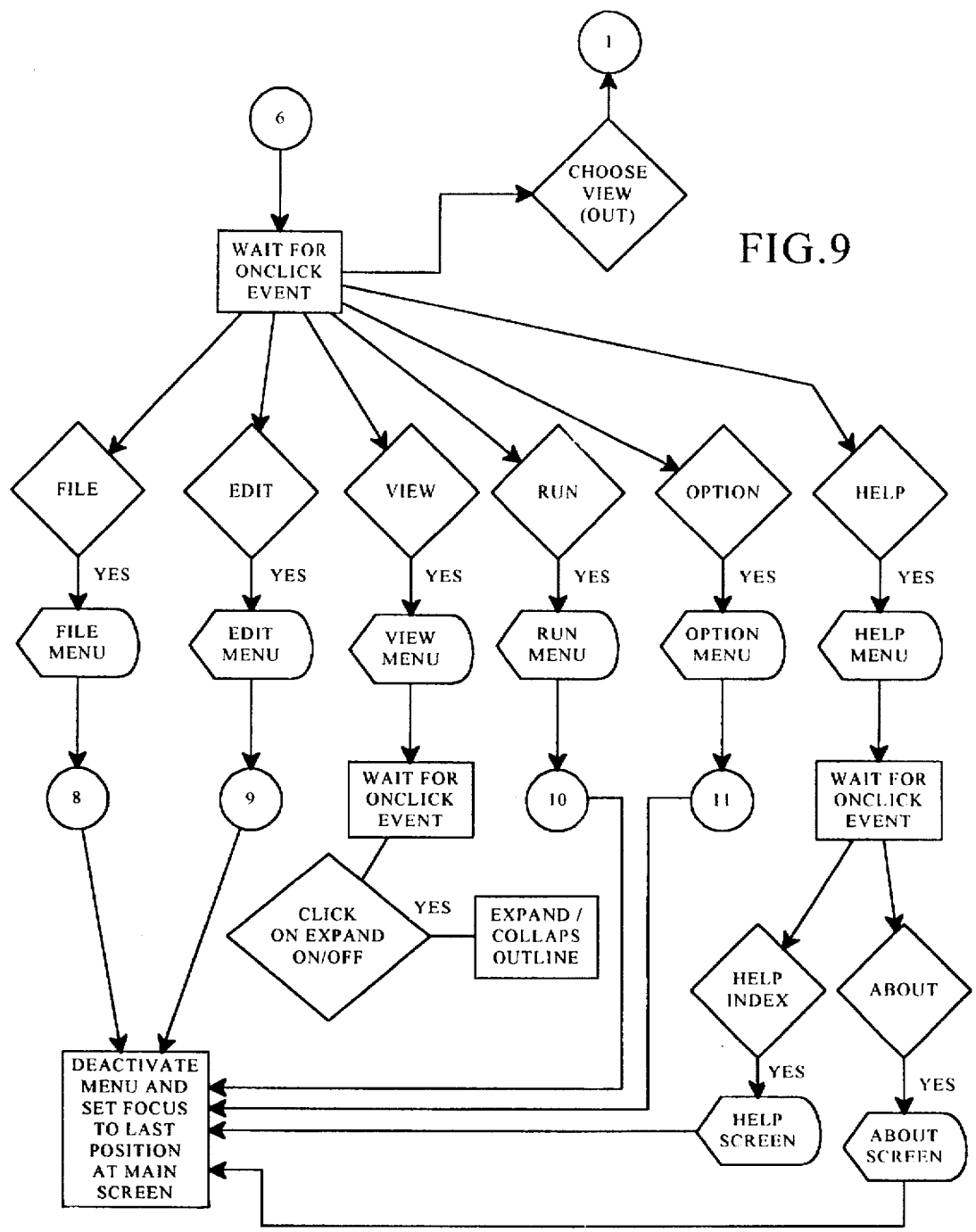

FIG. 9 shows the details of the system menu available to the user. In one embodiment, for instance, this could be a WINDOWS menu. It should be understood, however, that the present invention is not restricted to a WINDOWS operating environment.

Figure 10:
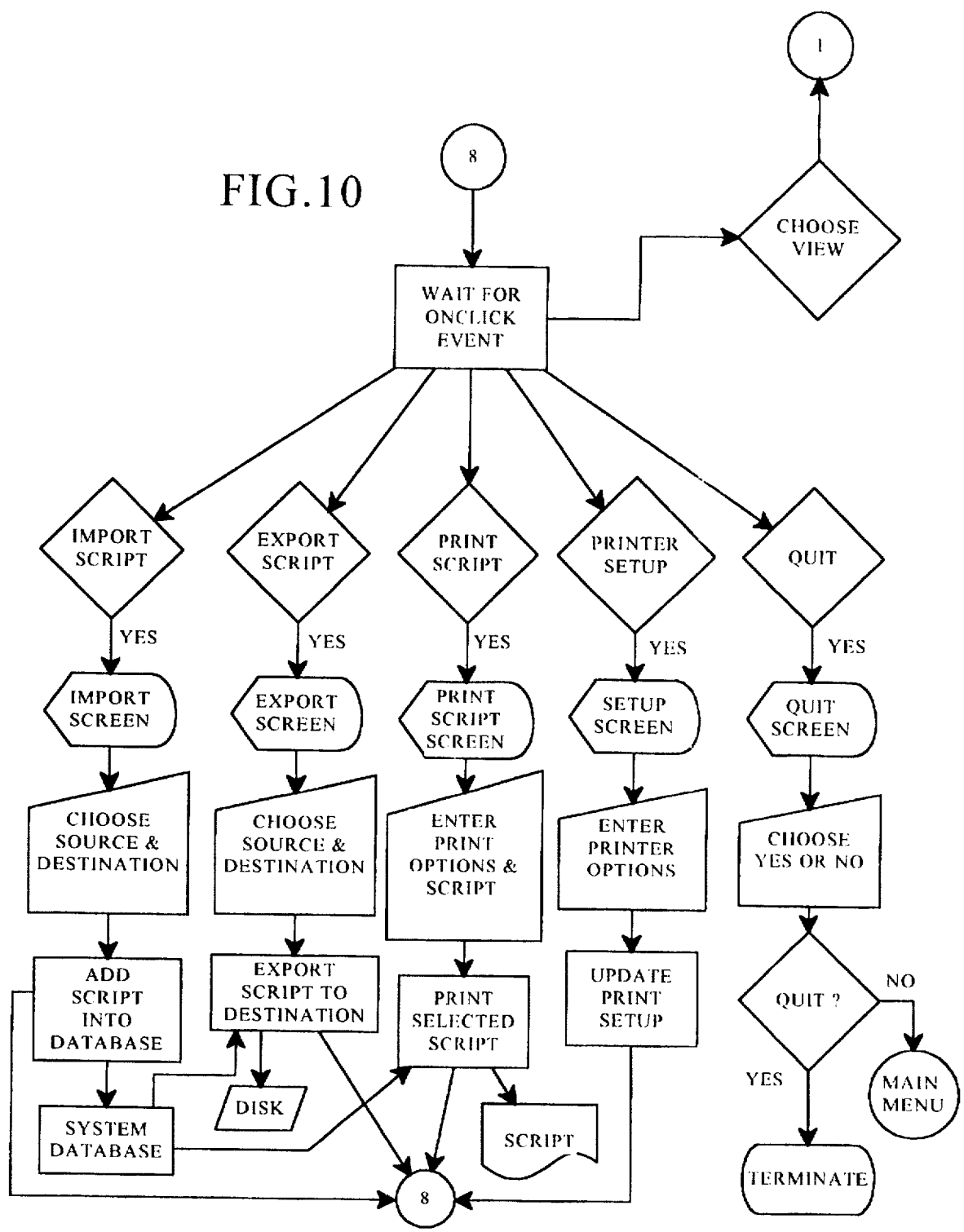
Figure 11:
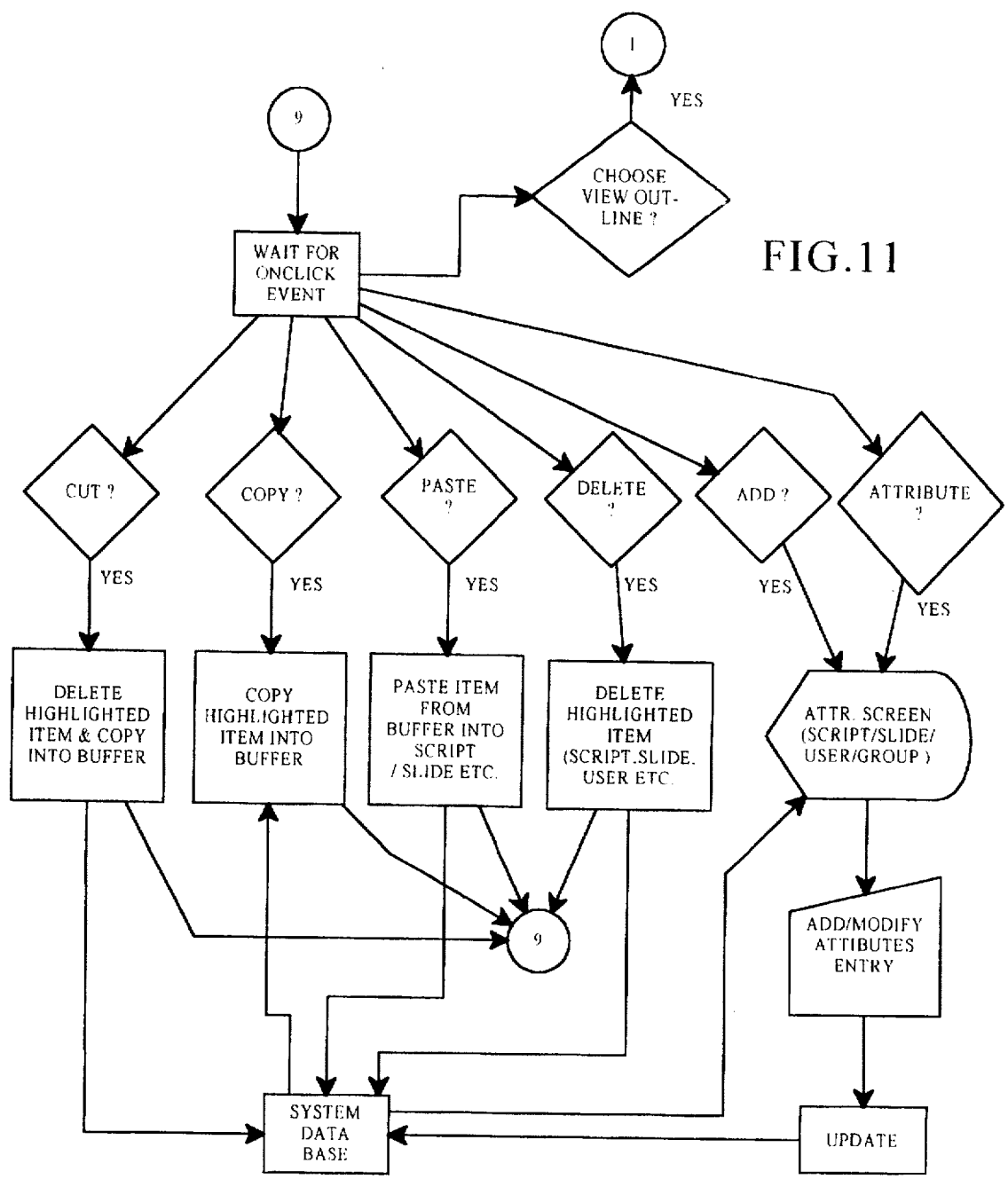
Figure 12:
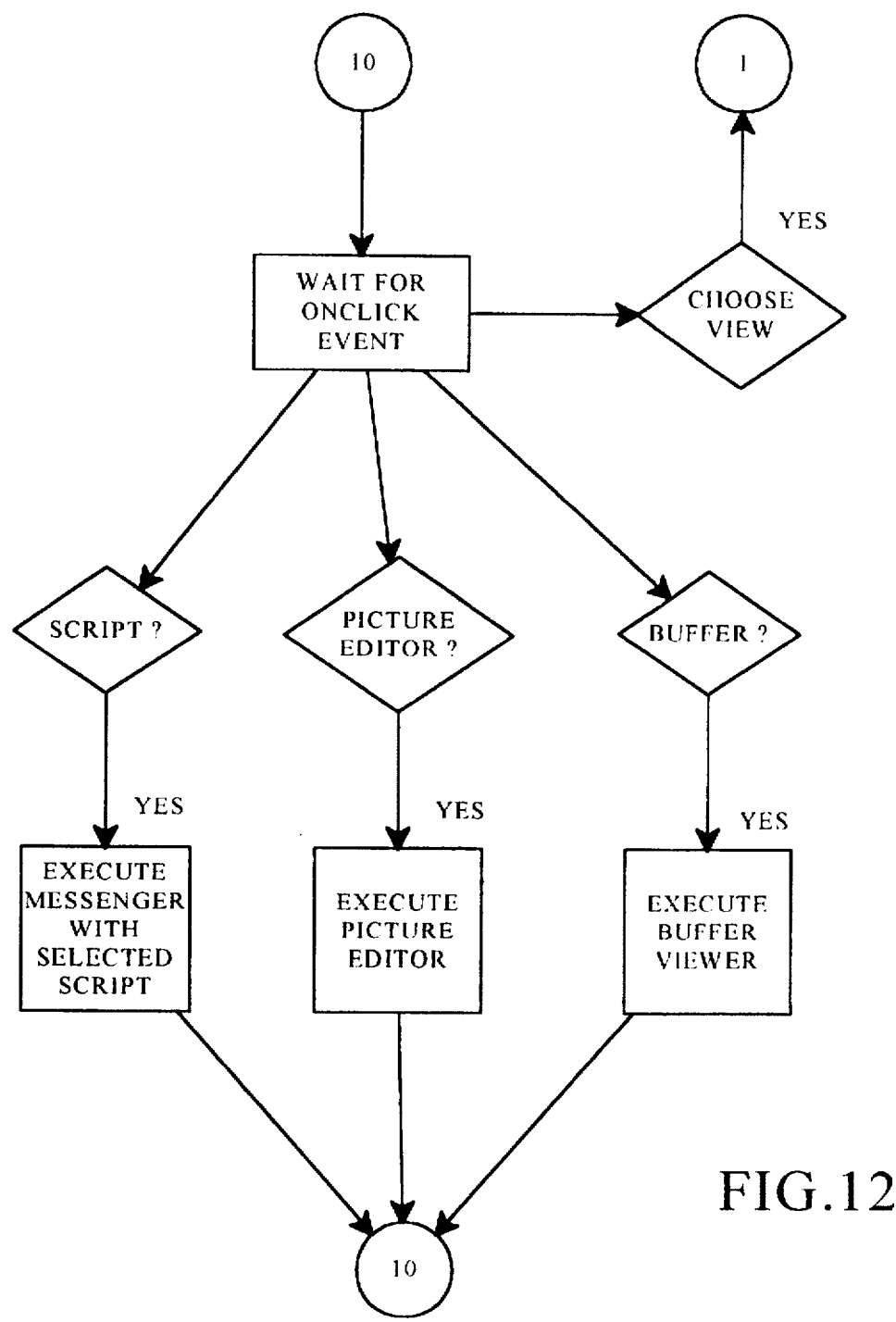
Figure 13:
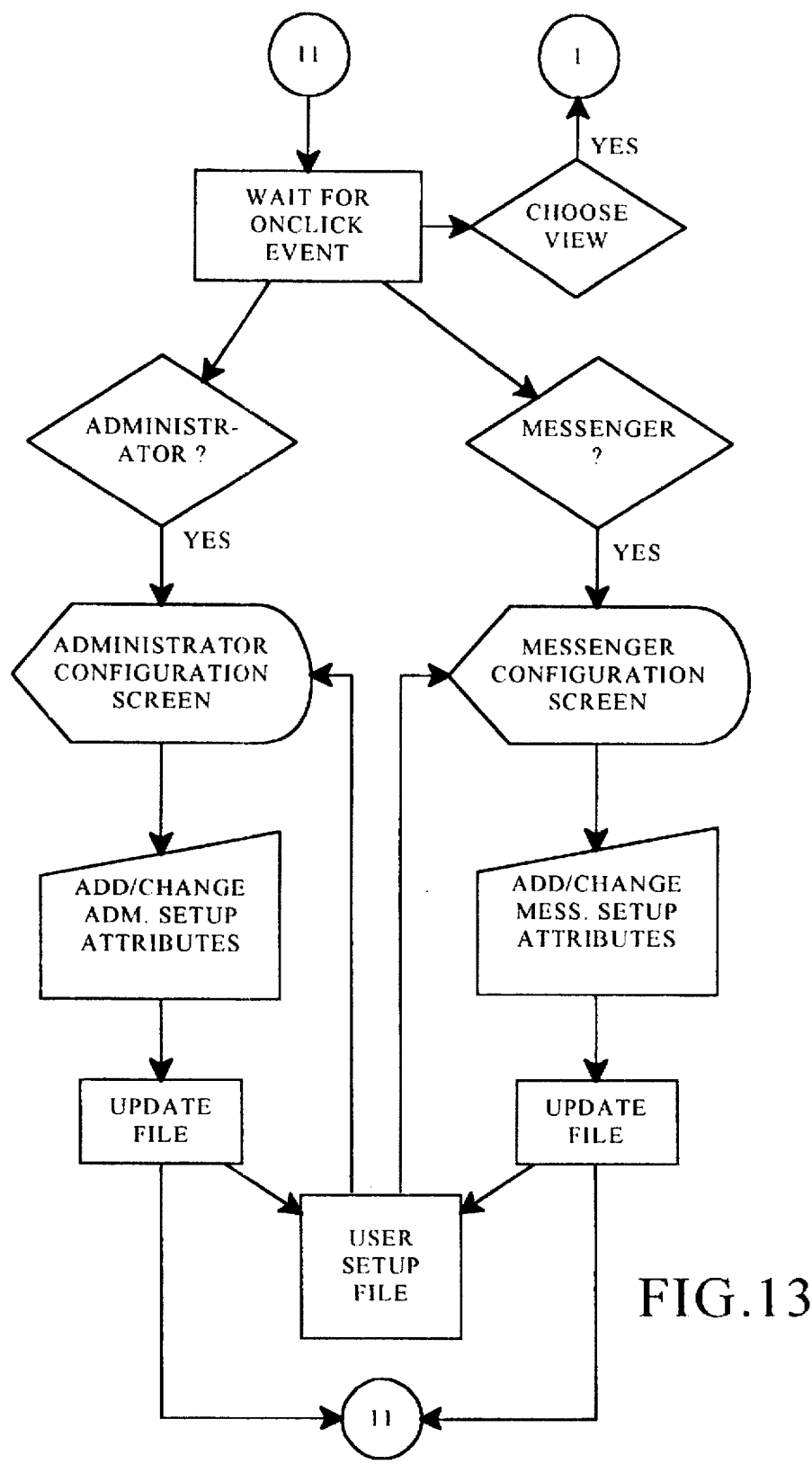

FIGS. 9–13 concern the overall operating means of the system, including menu options, which in the embodiment shown, is in a "pulldown" menu format. In FIG. 10, control is provided over the importing and exporting of presentations (scripts) and over the options available for printing the text and the visual information. A "quit" or terminate option is also provided. FIG. 11 is an "edit" menu, including choices which are active or non-active, depending on location of the administration module's cursor. In FIG. 12, a highlighted script can be run, a picture editor can be run, or the content of a buffer viewed. In FIG. 13, the basic system configurations for both the administration module 26 and the messenger module 22 can be changed, if desired.

As indicated above, each network PC in the system includes a messenger module which operates in conjunction with the system database 24 and has a communications capability with the database. When a network PC has not been in use for the specific period of time established for that particular PC, the messenger module, in coordination with the database, will automatically begin the assigned presentation on the PC's screen. The messenger module maintains control of the presentation on the screen to the extent that it has stored in its user's own setup file (a file on the PC's hard disk) the last slide which has been shown in the particular presentation then being used, even if the presentation has been interrupted by use of the PC. The presentation begins at the same point at which it was interrupted. The messenger module is responsible for this control. Each slide is shown for a preselected period of time, and then, if the PC is still not being used, the next slide in the presentation sequence is shown, again under the control of the messenger module.

As discussed briefly above, the administration module has the capability of scheduling a sequence of different scripts for each user. When one script is completed at a particular PC, the messenger module for that PC may either repeat that script or go to the next presentation in the schedule.

Each messenger module is controlled to some extent by the individual PC with which it is associated.

For instance, by pressing a designated key on the PC keyboard (or the correct mouse button), when a presentation is in progress, a control menu will appear on the user's screen over the current slide. This menu gives the user various possibilities by which to control the presentation. It is possible, for example, to reverse the presentation slide by slide, or the presentation may be fast-forwarded, slide by slide.

By pushing an eject button or other designated key, the user will also be able to go to another selected presentation among the several available to it through the administration module. The newly selected presentation will remain the "current" presentation until the broadcast schedule previously established in the administration module for that PC indicates that another presentation is due.

Figure 14:
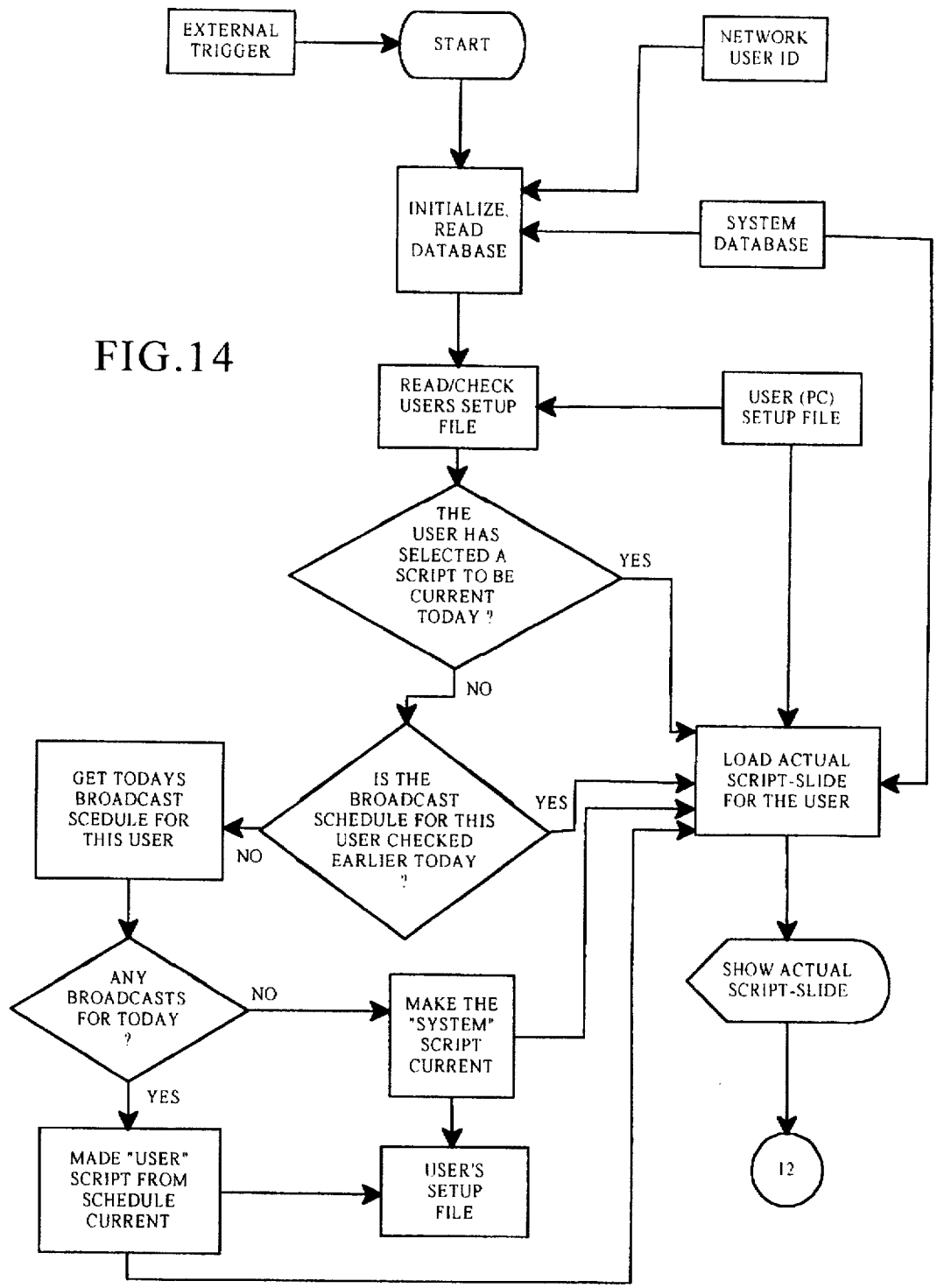
Figure 15:
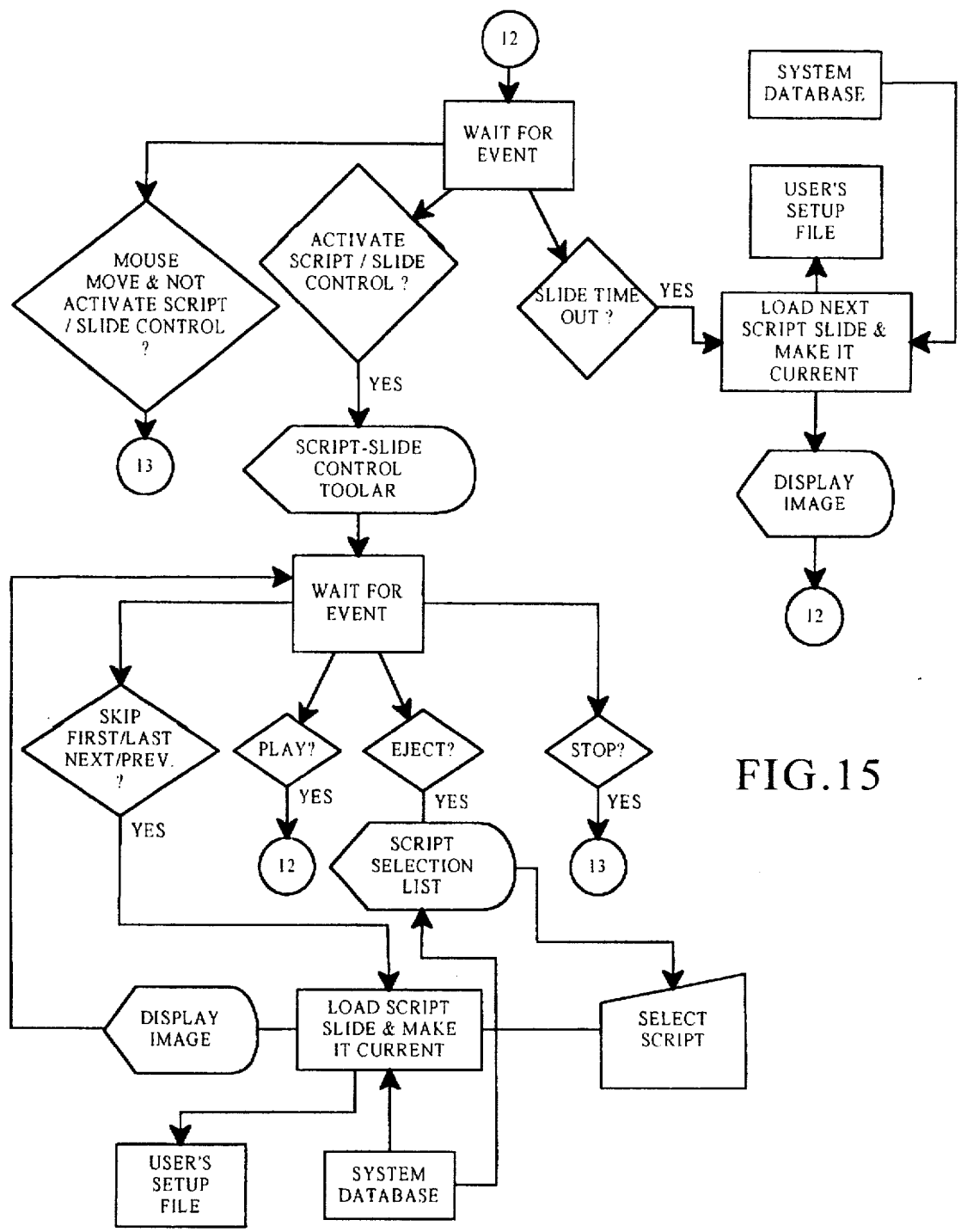

FIGS. 14 and 15 show the software control of the flow of data and the operating process for the system of the present invention. FIG. 14 shows the sequence of messenger module operation, including reading of database 24. The operation sequence begins each time the PC has not been used for a selected period of time. This is initiated by a trigger signal, which could originate at the PC or from the network server. FIG. 15 shows the functional process steps for showing an actual slide at the user's PC.

Figure 16:
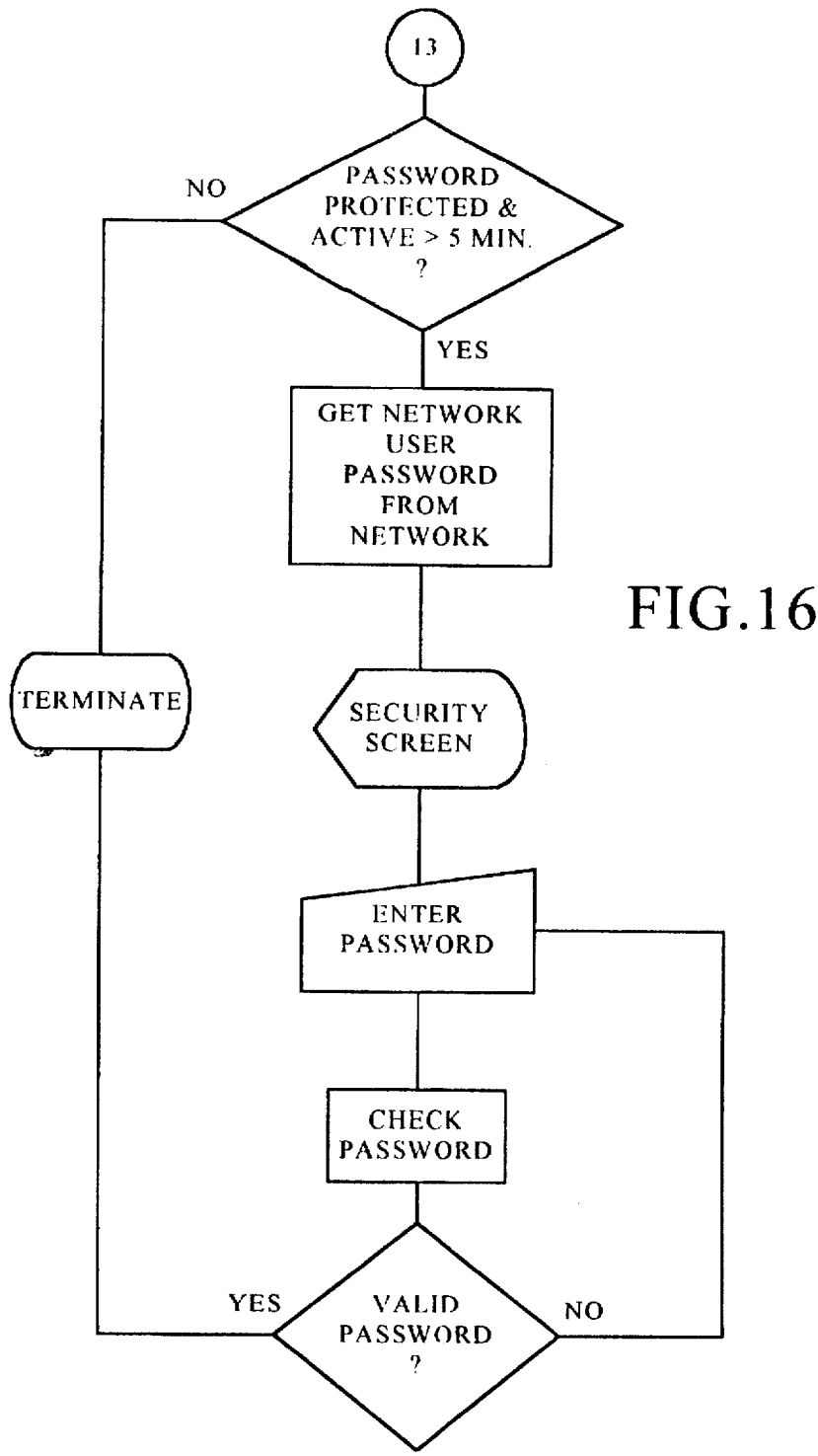

FIG. 16 shows the "quit" sequence for the messenger module, terminating current operation of its associated network PC in the presentation network. This sequence permits the PCs to return to their previous tasks.

As indicated above, FIGS. 3–16 are software flow charts for the present invention. These flow charts, in addition to the explanation provided above, provide sufficient information for one of ordinary skill in the art to produce the actual program code to accomplish the stated operation of the system.

Accordingly, a system has been described which is useful in the context of a network of personal computers. It includes the presentation of information and/or encouraging messages originated and provided from a network server to the individual PCs in the network at selected times, specifically after a certain elapsed time during which the PC has been on but has not been used.

Although a preferred embodiment of the invention has been disclosed herein for illustration, it should be understood that various changes, modifications and substitutions may be incorporated in such embodiment without departing from the spirit of the invention which is defined by the claims which follow.

What is claimed is:

1. A system for presenting information to a plurality of individual personal computers formed into a personal computer network, the personal computers capable of conventional computer task operation, comprising:

a system database accessible to the personal computers in the network for storing at least one presentation sequence which includes a selected sequence of images suitable for display on a personal computer screen, wherein the presentation sequence is distinct from and secondary to the conventional computer task operations of the personal computers and is composed around a selected topic;

a system administration module, capable of communicating with said system data base, for composing said presentation sequence;

messenger module means in each personal computer in the network for obtaining the presentation sequence from the system data base and for controlling the display of said presentation sequence on the screen of the messenger module's associated personal computer, wherein the presentation sequence is displayed on the screen only when said associated personal computer has been on but unused for a pre-selected period of time; and means at each personal computer, initiated by a user thereof, for returning the personal computer to its conventional computer task operation during the display of the presentation sequence, thereby terminating the display of the presentation sequence.

2. A system of claim 1, wherein the returning means at each personal computer includes means for gaining user control over the presentation of the sequence of images at said each personal computer.

3. A system of claim 1, wherein the database includes a plurality of presentation sequences.

4. A system of claim 3, wherein the personal computer includes means for changing to another presentation.

5. A system of claim 3, including means for selecting particular presentations for each personal computer user in the network.

6. A system of claim 5, including means for scheduling a successive series of presentations for each said user.

7. A system of claim 1, wherein each personal computer in the network is identified with a particular user, and wherein the system includes means for adding and deleting individual users from the database.

8. A system of claim 1, wherein each personal computer in the network is identified with a particular user and has a unique identification code.

9. A system of claim 1, wherein the administration module includes means for editing an existing presentation.

10. A system of claim 1, wherein the administration module includes means for arranging a plurality of images into a presentation.

11. A system of claim 10, including means for creating each image in the presentation sequence.

12. A system of claim 1, wherein the images comprise both visual and text material.

13. A system of claim 1, including means for obtaining presentations from an external source.

14. A system of claim 1, including means for providing presentations to an external source.

* * * * *